United States Patent [19]
Kassahun et al.

[11] 4,439,467
[45] Mar. 27, 1984

[54] METHODS OF COATING LIGHTGUIDE FIBER AND PRODUCT PRODUCED THEREBY

[75] Inventors: Bahiru Kassahun, Roosevelt Township, Monmouth County; Montri Viriyayuthakorn, Hamilton Township, Mercer County, both of N.J.

[73] Assignee: Western Electric Company, Inc., New York, N.Y.

[21] Appl. No.: 418,317

[22] Filed: Sep. 15, 1982

[51] Int. Cl.³ .......................... G02B 5/14; B05D 7/20
[52] U.S. Cl. .................................. 427/163; 427/434.7
[58] Field of Search ............................. 427/163, 434.7

[56] References Cited
U.S. PATENT DOCUMENTS 2,768,911 10/1956 Bunch .
2,787,980 4/1957 McDermott .
4,246,299 1/1981 Ohls ................................ 427/163 X
4,409,263 10/1983 Aloisio et al. ....................... 427/163

OTHER PUBLICATIONS

Alioso et al., Patent Application Ser. No. 343,134, filed Jan. 27, 1982.

Primary Examiner—James R. Hoffman
Attorney, Agent, or Firm—J. F. Spivak

[57] ABSTRACT

A coating material is applied to drawn lightguide fiber in a manner which substantially prevents the inclusion of bubbles and which causes the fiber to be disposed substantially concentrically within the coating layer. The lightguide fiber is advanced through a continuum of coating material, which extends from a free surface of a reservoir and through two dies that are arranged in tandem, at a velocity which causes air to be entrained in the coating material. A pressure gradient is established between portions of the first die adjacent to its exit orifice. A first one of the dies communicates with the reservoir and the second die and further communicates at the interface of the dies with a pressurized supply of the coating material. The pressurized flow sufficiently enhances the pressure gradient in the first die and establishes sufficient volumetric flow of coating material upwardly through the first die to cause any bubbles in the coating material on the advancing fiber to be removed by recirculating streamlines and to be moved upwardly into the reservoir. The bubbles are substantially immediately removed from the reservoir by providing fluid exit channels through which bubble entrained coating material exits the reservoir in the vicinity adjacent the first die. Not only is the coating in the fiber substantially free of entrained air as it leaves the second die, but coalescing bubbles do not misalign the fiber and the fiber is disposed concentrically within the coating because of a precentering effect of the first die and enhanced self-centering caused by pressure in the chamber.

4 Claims, 5 Drawing Figures

METHODS OF COATING LIGHTGUIDE FIBER AND PRODUCT PRODUCED THEREBY

TECHNICAL FIELD

This invention relates to methods of and apparatus for coating elongated material. More particularly, it relates to methods of and apparatus for applying a layer of a substantially bubble-free coating material concentrically about a lightguide fiber which is drawn from an optical preform.

BACKGROUND OF THE INVENTION

The successful implementation of a lightwave communication system requires the manufacture of high quality lightguide fibers having mechanical properties sufficient to withstand stresses to which they are subjected. Typically, the fiber has an outside diameter of 0.13 mm and is drawn from a glass preform having an outer diameter of 17 mm. Each fiber must be capable of withstanding over its entire length of a maximum stress level which the fiber will encounter during installation and service. The importance of fiber strength becomes apparent when one considers that a single fiber failure will result in the loss of several hundred circuits.

The failure of lightguide fibers in tension is commonly associated with surface flaws which cause stress concentrations and lower the tensile strength from that of the pristine unflawed glass. The size of the flaw determines the level of stress concentration and, hence, the failure stress. Even micron-sized surface flaws cause stress concentrations which significantly reduce the tensile strength of the fibers.

Long lengths of lightguide fibers have considerable potential strength but the strength is realized only if the fiber is protected with a layer of a coating material such as a polymer, for example, soon after it has been drawn from a preform. This coating serves to prevent airborne particles from impinging upon and adhering to the surface of the drawn fiber which would serve to weaken it. Also, the coating shields the fiber from surface abrasion, which could be inflicted by subsequent manufacturing processes and handling during installation, provides protection from corrosive environments and spaces the fibers in cable structures.

In one process, the coating material is applied by advancing the lightguide fiber through a reservoir in an open cup applicator containing a liquid polymer material Typically, the fiber enters the reservoir through a free surface, and exits through a relatively small die orifice at the bottom of the reservoir. The coating material is treated, the diameter of the coated fiber is measured and the fiber is taken up by a suitable capstan.

Uniform wetting of the fiber during the coating process is largely affected by the behavior of an entrance meniscus which exists where the fiber is advanced through the free surface of the coating material in the reservoir. As is well known, the wetting characteristics of two materials such as a coating and glass, depend on surface tension and chemical bonds which are developed between the two materials.

The wetting characteristics are affected by a pumping of air into the meniscus. During the coating process, both the fiber surface and the polymer surface are moving at a relatively high speed. The moving surfaces shear the surrounding air, causing it to flow into the point of the meniscus. The drawn fiber pulls a considerable amount of air into the coating material as it enters the free surface of the reservoir. Thus in the coating applicator, the entrance meniscus is drawn down with the moving fiber, instead of rising along its surface as it does under static conditions.

It has been found that as the draw rate exceeds about 0.2 meter per second, which is less than the commonly used rate of approximately one meter per second, this pumping action causes the meniscus to extend downwardly and develop essentially into a long, thin column of air which surrounds the fiber and is confined by surface tension in the coating material. Tests have shown that the viscosity of air is sufficiently high to sustain a column of air of considerable depth.

Air entrainment in the form of bubbles on the moving fiber occurs as relatively thin packets of air break off from the column and are carried along with the fiber on its surface. They remain on the fiber, resembling a skin, until they reach a region of pressure gradient in the vicinity of the die opening where they are compressed. This causes the air packets to bulge and form bubbles which may be removed by the surrounding flow lines leading away from the fiber. Should an air packet be compressed farther downstream where all the flow lines extend out of the die with the fiber, the bubble can exit along with the fiber. As the quantity of these bubbles increases, more tend to pass through the die and remain in the coating on the fiber.

As the draw speed is increased, the meniscus becomes unstable, oscillating between a fully developed state with circulation and a relatively small one with little or no circulation. At higher speeds, the column can extend completely through the polymer coating material. In such case, the fiber no longer contacts the polymer, the meniscus collapses and the fiber exits the die with no coating material or with an intermittent, beaded coating.

Bubbles in the fiber coating or beaded coatings may cause several problems. Larger bubbles may extend through the coating thereby exposing the fiber to the environment and to mechanical effects such as abrasion whereas smaller size bubbles cause losses in transmission. In the case of a beaded structure, portions of the fiber may be inadequately coated, while the beads themselves can increase microbending losses when the fiber is packaged into a ribbon assembly. If the fiber is not centered within the coating, portions of its periphery may be inadequately protected from the environment. Instabilities associated with air entrainment can produce fiber misalignment within the coating as well as coating diameter variations. Also, as in the case of smaller bubbles, poor centering can cause transmission losses.

As the coating progresses, bubbles accumulate in the reservoir. It has been found that these bubbles move rapidly with the steamlines in the fluid and coalesce into larger ones. The large, coalesced bubbles interact mechanically with the fiber causing instabilities in fiber alignment with the die.

The prior art has addressed these problems. For example, in one method, the fiber is advanced through an opening in a baffle plate positioned in a reservoir to alleviate or substantially eliminate entrainment of air and consequent bubble formation in the fiber coating. Bubbles are stripped from a region about the fiber due to a hydrodynamic pressure increase in the fluid pressure as the fiber passes through the constriction in the fluid path caused by the baffle plate. Pressure changes are made by changing the geometry of the arrangement such as, for example, the size of the baffle plate opening.

Another coating applicator is shown in U.S. Pat. No. 4,246,299. A fiber is passed through an applicator having a die body that defines a small vertically oriented, longitudinal tapered passage having a reservoir disposed thereabout. A series of radial ports provide fluid communication between the reservoir and the passage. Turbulence within the coating material, which causes entrapment of air bubbles, is reduced by maintaining the level of the coating material in the passage.

In still another apparatus, coating material is directed under pressure radially inward toward a cylindrical passage through which the fiber is advanced. The pressure is maintained sufficiently high along the length of the passage to substantially prevent air from entering the passage as the fiber is pulled therethrough. The diameter of the passage is sufficiently large to prevent contact of the fiber with its sides.

In yet another apparatus, there is provided a continuum of liquid coating material, which extends from a free surface in a reservoir through first and second dies at opposite ends of a chamber. The elongated material, which may be drawn lightguide fiber, is advanced through the coating material at a velocity which causes air to become entrained in the coating material and in a direction from the reservoir to the second die. The advance of the elongated material through the coating material causes a pressure gradient to be established between portions of the first die and between the chamber and the second die. The pressure in the coating material decreases from an exit orifice of the first die to the free surface and increases from within the chamber to a location prior to an exit orifice of the second die. Coating material is flowed into the chamber at a pressure which sufficiently enhances the pressure gradient between the portions of the first die to cause air bubbles on the elongated material to be stripped. The introduction of the coating material into the chamber also establishes a volumetric flow of the coating material from the chamber into the reservoir. This is effective to cause the bubbles to be removed and causes the coating material in the chamber and on the coated elongated material to be substantially bubble-free.

As for the familiar extrusion coating of plastic on copper to produce an insulated conductor, the conductor is drawn through a close-fitting core tube, through a die cavity and through the die land wherein a polymer coating is applied at high pressures. However, when coating lightguide fibers, care must be taken to avoid contact of the drawn fiber with the coating apparatus.

Notwithstanding the existence of proffered solutions to the problem of bubbles in lightguide fiber coatings, further improvements in the methods and apparatus which reliably substantially reduce, if not eliminate such bubbles are desirable. Each layer of coating material should be one which is continuous, well-centered about the lightguide fiber and uniformly thick. However, due to the fact that the bubbles which are produced enlarge as they travel toward the reservoir free surface, there is still a tendency for these bubbles to impact the fiber thereby causing misalignment of the fiber in the die.

SUMMARY OF THE INVENTION

The foregoing problems have been overcome by the methods and apparatus of this invention. A method of coating an elongated material to provide a substantially bubble-free covering includes the provision of a continuum of liquid coating material, which extends from a free surface in a reservoir contiguous with and over a first die and thence into a second die. The elongated material, which may be drawn lightguide fiber, is advanced through the coating material at a velocity which causes air to become entrained in the coating material and in a direction from the reservoir to the second die. The advance of the elongated material through the coating material tends to cause a pressure gradient to be established between portions of the first die and the second die. This pressure gradient is opposed by a pressurized feed of coating material at or around the interface of the first and second dies. Coating material is flowed into the dies at a pressure which causes air packets and bubbles on the elongated material to be stripped from around the material prior to its entering the second die. The introduction of the coating material under pressure into the apparatus also establishes a volumetric flow of the coating material upwardly into the reservoir. This is effective to cause the bubbles to be removed and causes the coating material in the chamber and on the coated elongated material to be substantially bubble-free. In order to remove the bubbles before they have an opportunity to enlarge and cause misalignment of the elongated material in the die, a plurality of coating material exit ports are provided in the vicinity of the top of the first die so as to divert the bubble entrained material from the reservoir before any substantial bubble growth occurs.

In an apparatus for applying a substantially concentrically disposed bubble-free coating material to an elongated material, a container is provided to hold a reservoir of the coating material. The coating material has a free surface and extends through an elongated passageway of a cavity of a first die through an exit orifice and through a cavity of a second die and its exit orifice. The lightguide fiber is advanced through the container, the first die, and the second die at a velocity which is sufficiently high to cause air to become entrained in the coating material. A pressure gradient is established between portions of the first die and between the cavity of the second die and a location adjacent to its exit orifice the pressure decreases in a direction from the exit orifice of the first die to the free surface and also increases from a location within the cavity of the second die to a point adjacent to the exit orifice of the second die. The apparatus also includes means for directing a flow of the coating material into the second die at or near its interface with the exit orifice of the first die at a pressure which is sufficiently high to cause a volumetric flow of the coating material upwardly from the cavity of the second die into the reservoir. It is also sufficiently high to substantially enhance the pressure gradient between portions of the first die, particularly between the elongated passageway and the exit orifice. As a result, bubbles are removed from the fiber and migrate into the reservoir. Exit means for the bubble entrained coating material is provided in the vicinity of the top of the first die so as to divert substantially all of the bubble entrained material from the reservoir before the bubbles can substantially coalesce and grow to a size which would disturb the alignment of the fiber in the apparatus. The coating material in the second die is substantially bubble-free thereby resulting in a substantially bubble-free coating on the fiber.

BRIEF DESCRIPTION OF THE DRAWINGS

Other features of the present invention will be more readily understood from the following detailed description of specific embodiments thereof when read in conjunction with accompanying drawings, in which.

DETAILED DESCRIPTION

Figure 1:
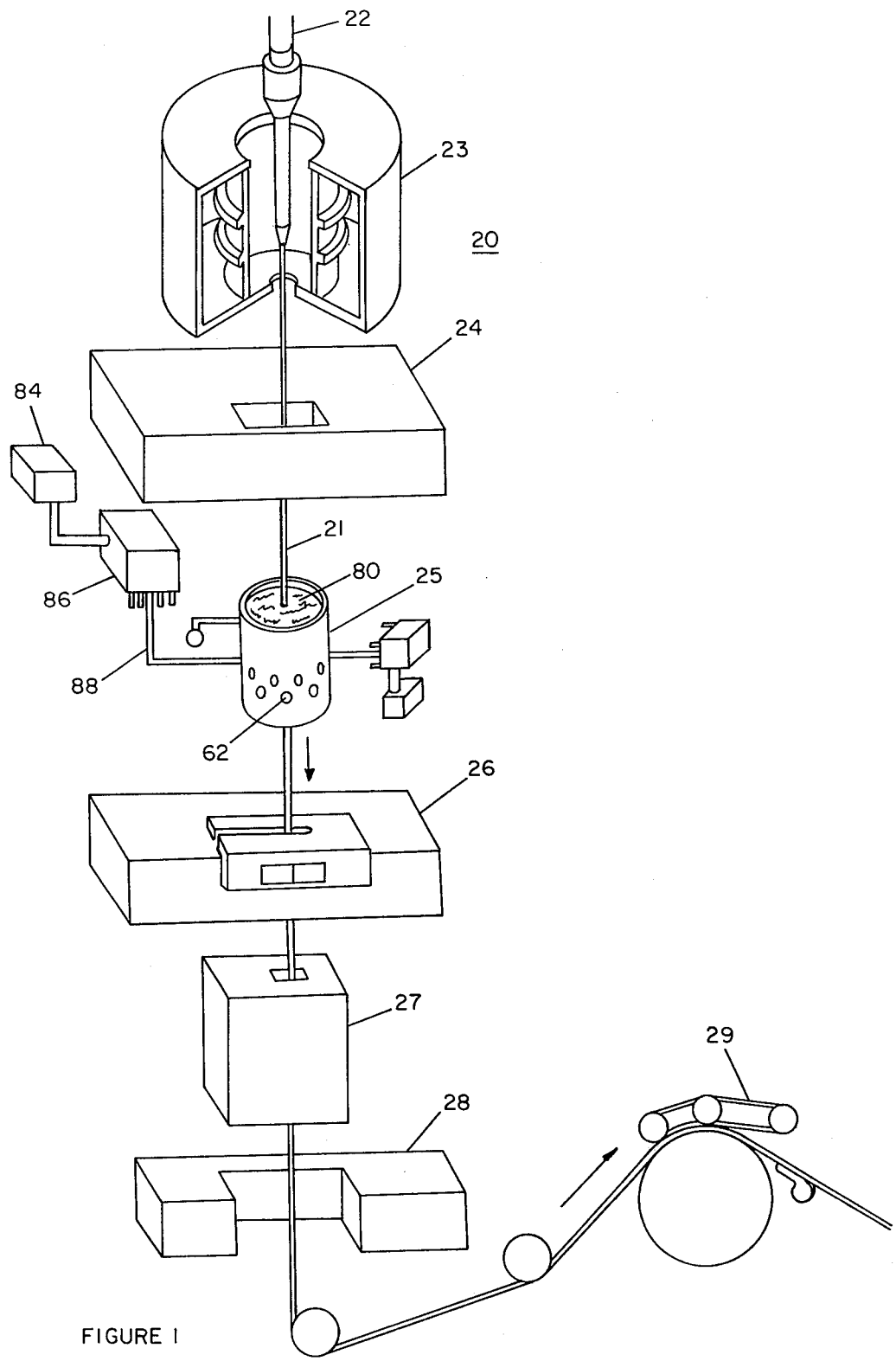
FIG. 1 is a perspective view of an apparatus for drawing lightguide fiber from a vertically suspended preform and for coating the drawn fiber.
Figure 2:
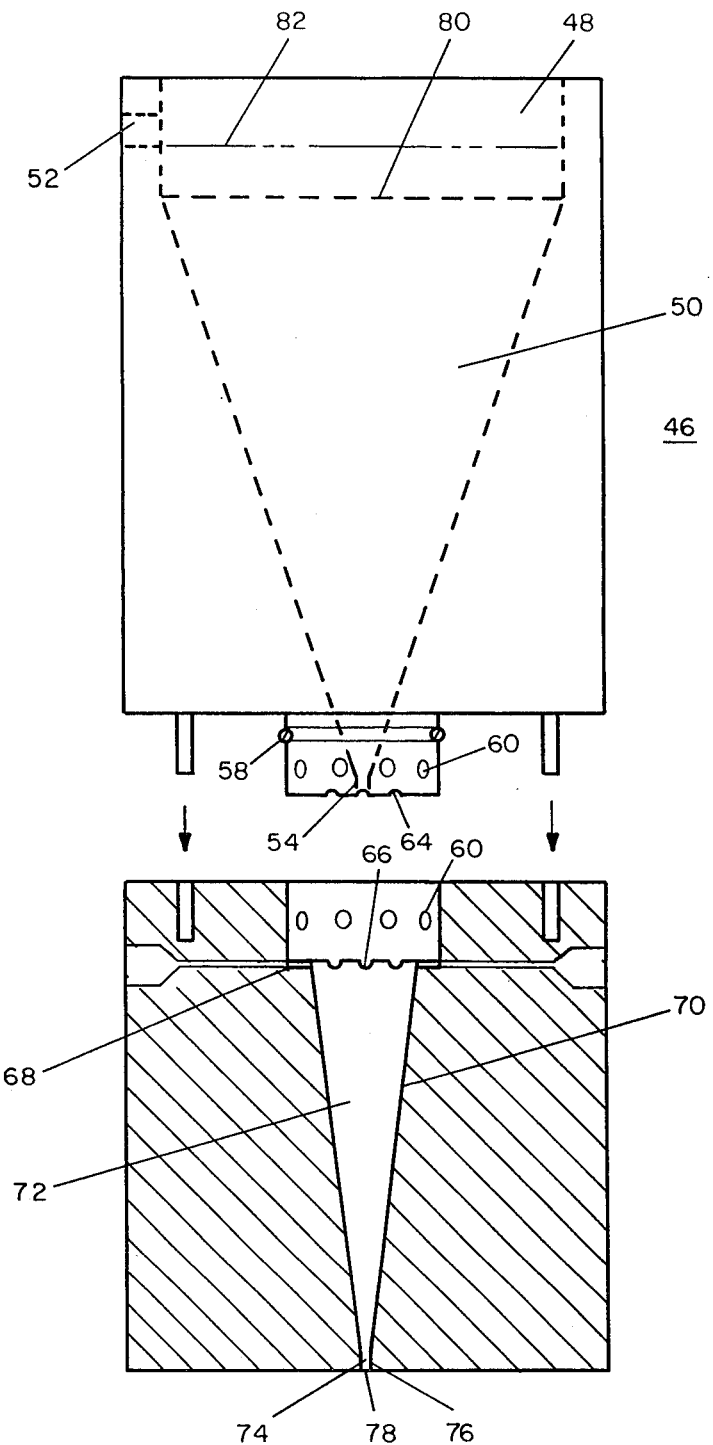
FIG. 2 is a side elevational view of an apparatus for coating the drawn lightguide fiber showing the apparatus in a separated position and partially in section and with phantoms for greater detail.
Figure 3:
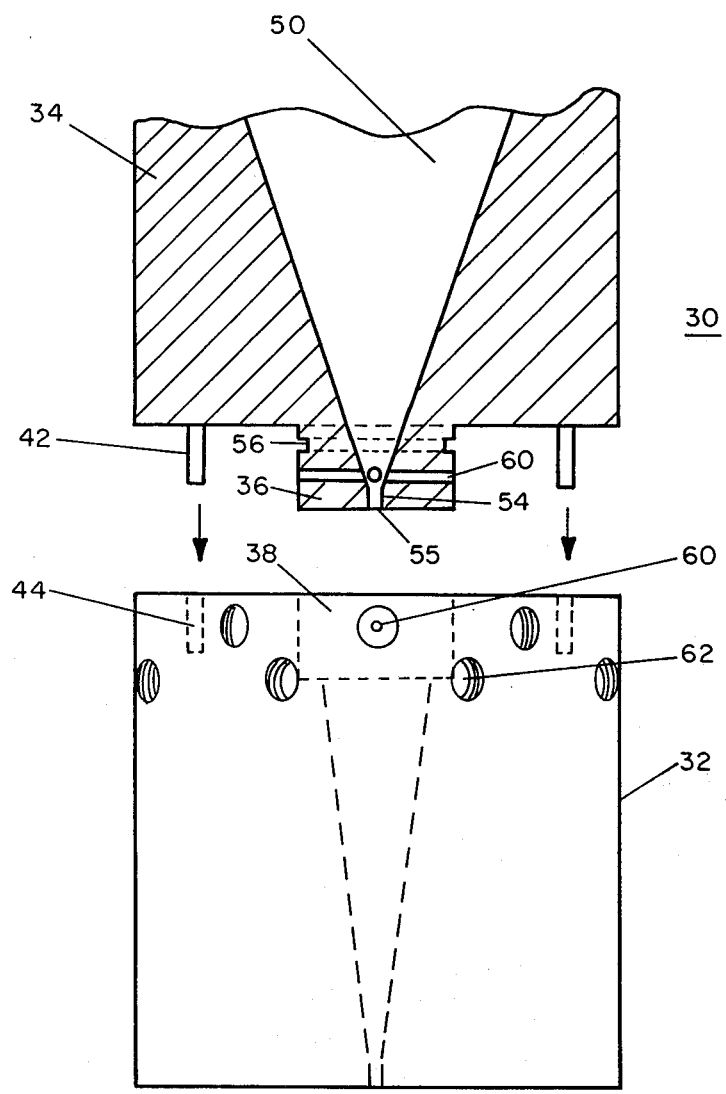
FIG. 3 is a side elevational and partially cross-sectional view of the apparatus shown in FIG. 2 rotated $22\frac{1}{2}°$.
Figure 4:
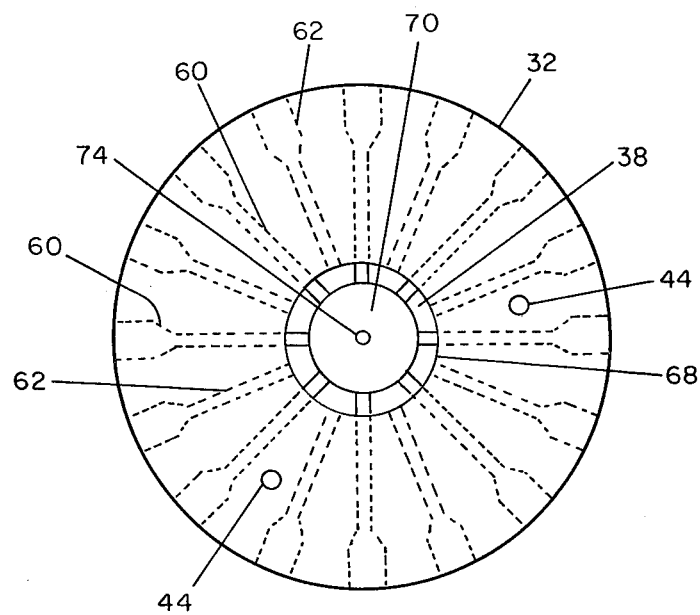
FIG. 4 is a top view of the lower half of the apparatus of FIG. 1 showing some of the details in phantom.
Figure 5:
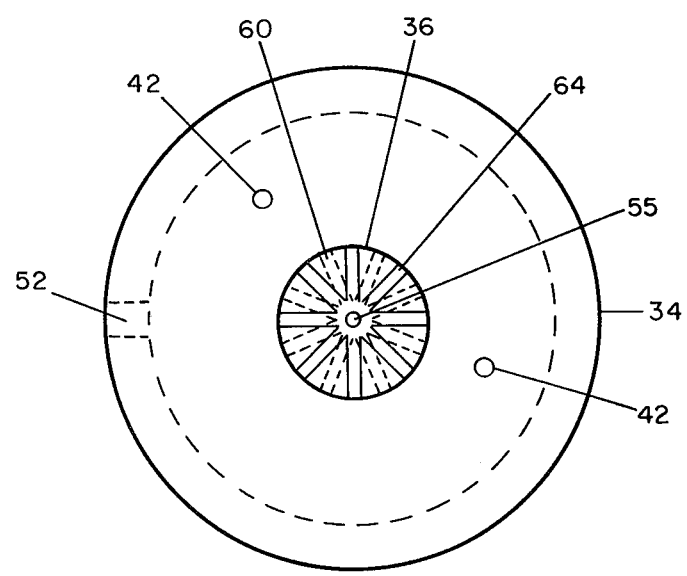
FIG. 5 is a bottom view of the top half of the apparatus shown in FIG. 1.

Referring now to FIG. 1, there is shown an apparatus which is designated generally by the numeral 20 and which is used to draw a lightguide fiber 21 from a specially prepared cylindrical preform 22 and to then coat the fiber. The lightguide fiber 21 is formed by locally and symmetrically heating the preform 22 which is typically 17 mm in diameter and 60 cm in length to a temperature of about 2000° C. As the preform is fed into and through a furnace 23, fiber 21 is drawn from the molten material.

As can be seen in FIG. 1, the elements of the draw system include the furnace 23, wherein the preform is drawn down to the fiber size, after which the fiber 21 is pulled from the heat zone. The diameter of the fiber 21 which is measured by a device 24 at a point shortly after the furnace 23 becomes an input into a control system. Within the control system, the measured diameter is compared to the desired value and an output signal is generated to adjust the draw speed such that the fiber diameter approaches the desired value.

After the diameter of the fiber 21 is measured, a protective coating is applied by an apparatus 25 of this invention. Then, after the coated fiber 21 passes through a centering gauge 26, a device 27 for treating the coating and a device 28 for measuring the outer diameter of the coated fiber, it is moved through a capstan 29 and is spooled for testing and storage prior to subsequent operations. The preservation of the intrinsically high strength of lightguide fibers is important during the ribboning, jacketing, connectorization and cabling of the fibers and during their service lives.

Preservation of fiber strength requires the application of the protective coating, which shields newly drawn fiber from the deleterious effects of the atmosphere. This coating must be applied in a manner that avoids damage to the surface of the fiber 21. An off-centered fiber 21 may result in damage to its fiber surface during the coating process which can have an adverse effect on fiber strength and microbending loss. The fiber must have a predetermined diameter and be protected from abrasion during subsequent manufacturing operations, installation and service. Minimizing attenuation requires the selection of a suitable coating material and a controlled application of it to the fiber 21. It is also important that the coating layer be disposed concentrically about the lightguide fiber.

As can be seen in FIGS. 2-5 of the drawings, the apparatus 25 for coating the drawn lightguide fiber 21 includes a pair of mating upper and lower cylindrical members 30 and 32, respectively, which can be formed from metal, rigid plastic or other rigid material. The upper member 30 comprises a main large cylindrical section 34 and a downwardly extending, centrally located short cylindrical insert section 36 extending from the bottom of the main section 34. The insert 36 is of smaller diameter than the large section 34 and mates the upper and lower members 30 and 32 by fitting within a central cylindrical insert receiving cavity 38 provided in the top of the lower member 32. The respective members 30 and 32 are further mated by means of a pair of alignment pins 42 which extend from the bottom of the main section 34 of the upper member 30 and fit within corresponding alignment holes 44 provided in the top of the bottom member 32. The pins 42 and holes 44 are so situated that registration is possible in only one position.

The upper member 30 is provided with a fluid reservoir 46 in the form of a cavity having an upper cylindrical section 48 and a truncated conical section 50. The upper section 48 is open to the air and is provided with a fluid overflow port 52. The conical section 50 of the reservoir 46 terminates within the insert section 36 of the upper member 30 and communicates with a land 54 of a first die of the apparatus 25 which extends from the end of the conical section 50 of the reservoir 46 to the bottom of the insert section 36 of the upper member 30 terminating in a first die exit orifice 55.

The orifice 55 must be of a diameter so as to allow free passage of the fiber 21 to be coated. Typically, the orifice 55 has about a 0.037 cm diameter and a land length of about 0.25 cm.

The insert section 36 is provided with an annular groove 56 into which an O-ring 58 sets. The O-ring 58 forms a fluid tight seal when the upper and lower members 30 and 32 are mated. A plurality of spaced converging bubble entrained fluid exit holes 60 extend horizontally through the short cylindrical section 36 below the groove 56 to a point in the reservoir 46 just above the land 54. In the apparatus 25, as shown, the fluid exit holes are spaced at intervals of 45°. Below the fluid exit holes 60 and in line with the bottom of the orifice 55, when the members are mated a plurality of spaced, pressurized fluid entry channels 62 are provided which converge at the bottom of the orifice 55. The fluid exit holes 60 and pressurized fluid entry channels 62 are drilled while the upper and lower members 30 and 32 are in mated position such that the upper portion of the lower member 32 adjacent the cylindrical cavity 38 therein has a matching set of holes 64 and 66, respectively, which are registered with and are continuations of the respective holes or channels 60 and 62 when the parts are mated. Since the center of the pressurized fluid entry channels 62 is in the same plane as the bottom of the orifice 55, when the upper and lower members 30 and 32 are separated, these holes appear as semicircular grooves in the bottom of the insert 36 and the bottom shoulder 68 of the insert receiving cavity 38.

Below the lower member shoulder 68 and communicating with the first die exit orifice 55, when the section 30 and 32 are mated, is a conical shaped second die 70. The second die 70 includes a cavity 72 having a truncated conical shape. The cavity 72 communicates through a cylindrical opening 74 of a land 76 of the second die with an exit orifice 78. Typically, the conically shaped portion of the cavity has an angle of about 14° between its sides. The opening 74 of the land 76 typically has a diameter of about 0.025 cm, the diameter of the coated fiber 21, and a length of about 0.1 cm.

For purposes of this invention, a continuum of coating material 80 is provided through which the lightguide fiber 21 is advanced. Beginning with a free surface 82 of the reservoir 46, the coating material 80 extends through the reservoir 46 and land 54 of the first die, through the exit orifice 55 and into the cavity 72 of the second die 70 and through the second die 70 finally exiting the exit orifice 78.

Also, provisions are made for connecting the plurality of pressurized fluid entry channels 62 and bubble entrained fluid exit holes 60 through a conduit to a pressurized fluid supply source and a collection tank, (not shown), respectively. The reservoir overflow can also be coupled to the collection tank. Accordingly, the various holes and channels terminate in enlarged orifices provided with screw threads for coupling the respective holes and channels to the external supply source and collection or the like.

In operation the fiber 21 is advanced at a velocity which causes air to become entrained in the reservoir 46. The advance of the fiber 21 causes a pressure gradient to be established along its path of travel between the free surface of the reservoir and the first die exit orifice 55 with the gradient being a maximum near the exit orifice 55 of the die. The pressure within the coating material 80 decreases from the exit orifice 55 of the first die to the free surface 82. Unlike single die arrangements or those including an elongated land, the pressure also increases from the cavity 72 following the exit orifice 55 of the first die to a point in the second die 70. Afterwards, the gauge pressure drops to zero just beyond the exit orifice 78 of the second die 70.

Coating material from the supply tank 84 (see FIG. 1) is directed into the fluid entry channel 62 by flowing it through a manifold 86 and then along conduits 88 into the entry channels 62 and into the base of the first die exit orifice 55. Sufficient positive pressure is applied to the coating material which is supplied to the channels 62 to cause a volumetric flow of the coating material upwardly through the first die into the reservoir 46. A suitable pressure is in the range of about 40 to 80 newtons per square centimeter, depending on the coating material and coating speed. As the fiber is advanced through the continuum of coating material 80, some of the liquid is pulled downwardly through the first die and into the exit orifice 55. The back pressure applied by means of the incoming liquid from the entry channels 62 causes a flow upwardly through the first die causing a net flow upwardly. This serves to increase the pressure gradient caused by the fiber being drawn through the die. The fiber as it is drawn through the free surface, entrain bubbles in the fluid coating the fiber. As a result of the back pressure and upward flow of fluid at the first die exit orifice these bubbles are stripped from the fiber. As a result, coating material in the second die is substantially free of bubbles and the fiber obtains a uniform, bubble-free coating upon exiting the second die.

If the bubble entrained fluid which is forced upwardly through the first die and reservoir is not quickly removed, e.g., if it is allowed to go to the free surface and be removed only at the overflow port, the bubbles have a tendency to enlarge due to pressure reduction and coalescence of bubbles. These enlarged bubbles may then contact the fiber and cause it to become misaligned due to mechanical impact with the moving fiber.

By providing the bubble entrained fluid exit holes just above the land of the first die, substantially all of the bubble entrained fluid flows out of the die before having an opportunity to grow and coalesce thereby eliminating the misalignment problem die to large upward flowing bubbles.

The coating process of the invention is suitable for primary coating of glass or plastic lightguide fiber, or for secondary coating of such fiber that is already coated. The process may be applied to either or both steps of a dual or multiple-coating in-line process or to any step of a sequential multiple-coating process where the fiber is spooled between coating steps. The process is also useful for the application of fluids to the fiber for surface modification prior to coating, for application of dyes or colorants for color coding, or for the application of fluid materials for other purposes. It is also useful for coating films comprised of materials other than glass such as polymer fibers, crystal fibers and metal fibers.

It is to be understood that the above-described embodiments are simply illustrative of the principles of the invention. Various other modifications and changes may be devised by those skilled in the art which will embody the principles of the invention and fall within the spirit and scope thereof.

What is claimed is:

1. A method of coating an elongated material to provide a substantially bubble-free covering, said method including the steps of:

advancing the elongated material through a continuum of liquid coating material, which extends from a free surface in a reservoir through communicating first and second dies at a velocity which causes air to become entrained in the coating material, the advancing of the elongated material being in a direction from the reservoir to the second die and causing a pressure gradient to be established between the reservoir and an exit orifice of the second die with the pressure increasing from the free surface to a location prior to the exit orifice of the second die; and flowing coating material into the vicinity of the exit orifice of the first die at a pressure which sufficiently enhances the pressure gradient between portions of the first die and second die and which establishes sufficient volumetric flow of the coating material from a chamber into the reservoir to cause the removal of bubbles from the elongated material and to cause the coating material in the chamber and on the coated elongated material to be substantially bubble-free and removing bubble entrained fluid entering the reservoir through fluid exit means in the lower portion of the reservoir before such bubbles can substantially coalesce.

2. The method of claim 1, wherein the pressure of the coating material is in the range of about 40 to 80 newtons/cm$^2$.

3. The method of claim 1, which also includes the step of maintaining the free surface in the reservoir at a predetermined level.

4. The method of claim 1, wherein the coating material is flowed into the die through a plurality of radially spaced holes the centers of which are in the same plane as the exit orifice of the first die and wherein the bubble entrained fluid exit means are a plurality of radially spaced channels which communicate with a portion of the reservoir immediately above a land of the first die.

* * * * *